United States Patent [19]

Van der Veken

[11] Patent Number: 4,786,235

[45] Date of Patent: Nov. 22, 1988

[54] WIND-ENGINE

[75] Inventor: Germaine Van der Veken, Bruxelles, Belgium

[73] Assignee: Gemaro A.G., Zurich, Switzerland

[21] Appl. No.: 127,374

[22] Filed: Dec. 2, 1987

[30] Foreign Application Priority Data

Dec. 31, 1986 [CH] Switzerland ................ 05259/86
Jun. 25, 1987 [CH] Switzerland ................ 02384/87

[51] Int. Cl.$^4$ ........................................... F03D 1/02
[52] U.S. Cl. .................................. 416/121; 416/11; 416/DIG. 6; 416/194
[58] Field of Search ............ 416/121 A, DIG. 6, 11, 416/194 A, 196 A, 9-10; 415/2 A-4 A

[56] References Cited

U.S. PATENT DOCUMENTS

| | | | |
|---|---|---|---|
| 321,985 | 7/1885 | Leavitt | 416/121 A X |
| 527,738 | 10/1894 | Touzelin | 416/170 A X |
| 715,935 | 12/1902 | Cochran | 416/121 A |
| 827,038 | 7/1906 | Schenbeck | 416/9 |
| 1,015,505 | 1/1912 | Moon et al. | 416/121 A X |
| 1,718,682 | 6/1929 | Bruce | 416/121 A X |
| 1,729,362 | 9/1929 | Ruthven | 416/121 A X |
| 1,963,912 | 6/1934 | Honnef | 416/121 A |
| 2,169,165 | 8/1939 | Reedy | 416/194 A X |
| 4,184,084 | 1/1980 | Crehore | 416/121 A X |
| 4,710,100 | 12/1987 | Laing et al. | 416/121 A |

FOREIGN PATENT DOCUMENTS

| | | | |
|---|---|---|---|
| 515963 | 12/1952 | Belgium | 416/121 A |
| 66540 | 3/1948 | Denmark | 416/121 A |
| 397391 | 7/1924 | Fed. Rep. of Germany | 416/170 A |
| 672606 | 3/1939 | Fed. Rep. of Germany | 416/121 A |
| 742242 | 11/1943 | Fed. Rep. of Germany | 416/121 A |
| 2138500 | 2/1973 | Fed. Rep. of Germany | 415/2 A |
| 2750248 | 5/1979 | Fed. Rep. of Germany | 415/2 A |
| 2941778 | 5/1981 | Fed. Rep. of Germany | 416/121 A |
| 3113247 | 10/1982 | Fed. Rep. of Germany | 416/121 A |
| 1074780 | 10/1954 | France | 416/121 A |
| 51970 | 4/1980 | Japan | 416/121 A |
| 57331 | 6/1920 | Sweden | 416/121 A |
| 02 411/86-1 | 1/1986 | Switzerland . | |

Primary Examiner—Everette A. Powell, Jr.
Attorney, Agent, or Firm—Bacon & Thomas

[57] ABSTRACT

A wind-engine of the type consisting of several wind devices rotatably mounted at several independent stages, which comprises the combination of vertical props (1) disposed within a circle (4); at each stage (2), crossbeams (5) connected, on one hand, to the vertical props (1) and meeting, on the other hand, at the center of the said circle (4); a vertical axis (7) situated at the center of the said circle (4) and, at each stage, a wind device rotatably mounted about the said vertical axis.

5 Claims, 4 Drawing Sheets

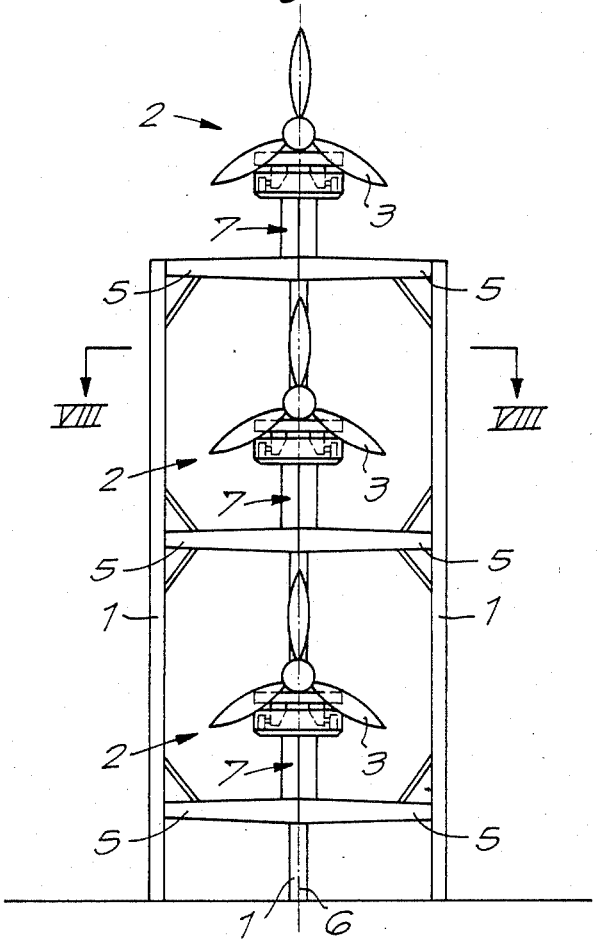
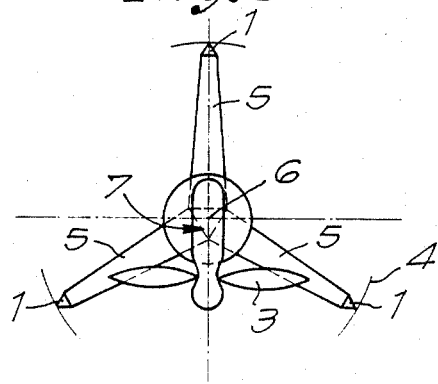

WIND-ENGINE

This invention relates to a wind-engine, more particularly, an engine of the type comprising several wind devices disposed independently and rotatably to each other at several stages.

Such a wind-engine has already been disclosed in the Swiss Pat. No. 2411/86.

Such known structure has several stages each of which is provided with a suitable number of wind devices capable of being individually rotated in the wind. This is advantageous in that the wind layers situated at different levels may be used although the phases of air input are set off.

The object of the present invention is such an engine which is stable even at high levels and at high wind speeds.

For this purpose, the wind-engine according to the invention comprises substantially the combination of circularly disposed vertical props; at each stage, crossbeams connected, on one hand, to the vertical props and meeting, on the other hand, in the center of the said circle; a vertical axis situated at the center of the said circle and a wind device rotatably mounted about the said vertical axis, at each stage.

In an alternate embodiment, at least one substantially horizontal element provided with several wind devices is rotatably mounted about the said axis, the said element being supported by the crossbeams.

The features of this invention will be more clearly apparent from the following description of some preferred embodiments given only by way of example without any limitation, reference being made to the enclosed drawings in which:

FIG. 7 shows another embodiment of an engine according to the invention;

FIG. 8 shows a section taken on the line VIII—VIII of FIG. 7.

Figure 1:
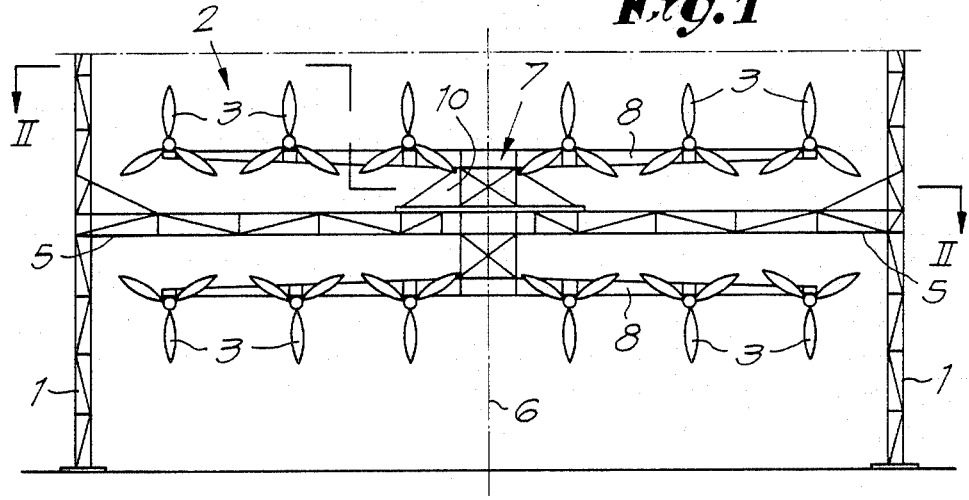
FIG. 1 shows a wind-engine according to the invention.
Figure 2:
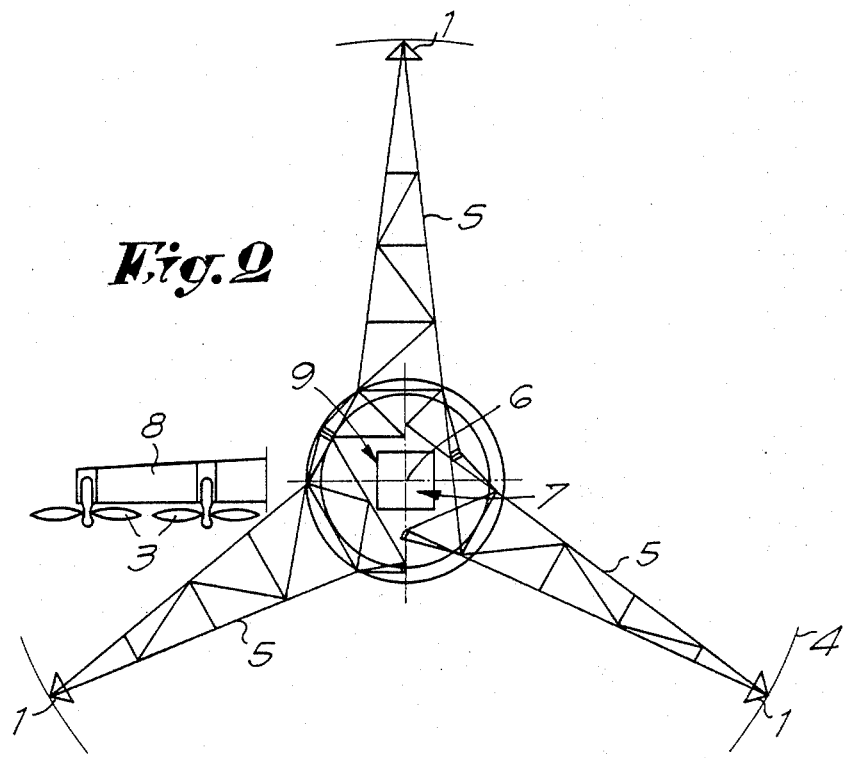
FIG. 2 shows a section taken on the lines II—II of FIG. 1.

As shown in FIGS. 1 and 2, the windengine according to the invention comprises substantially a number of vertical props 1 supporting several rotating stages 2 each of which is provided with several wind devices 3. The vertical props 1 are equally spaced along a circle 4. Of course, the number of vertical props 1 will depend namely on the height of the wind-engine.

Each stage 2 comprises crossbeams 5 connected, on one hand, to the vertical props 1 and meeting, on the other hand, within the center 6 of the circle 4.

At the center 6 of the 4 is rotatably mounted, but without any possibility of axial movement, a vertical axis 7 on which are mounted several horizontal bearing elements 8 which are themselves bearing the wind devices 3 in any suitable manner.

The crossbeams 5 are meeting together at the center 6 of the circle 4, either as shown in the left portion of FIG. 2, or as shown in the right portion of FIG. 2, thereby forming an opening 9 for an axis 7, on one hand, and for the electric conductors etc., on the other hand.

The bearing elements 8 are lying on the crossbeams 5 through a structure 10.

Said bearing elements 8 are provided with a driving device (not shown in the drawings) allowing to orientate the wind devices in the wind.

Figure 3:
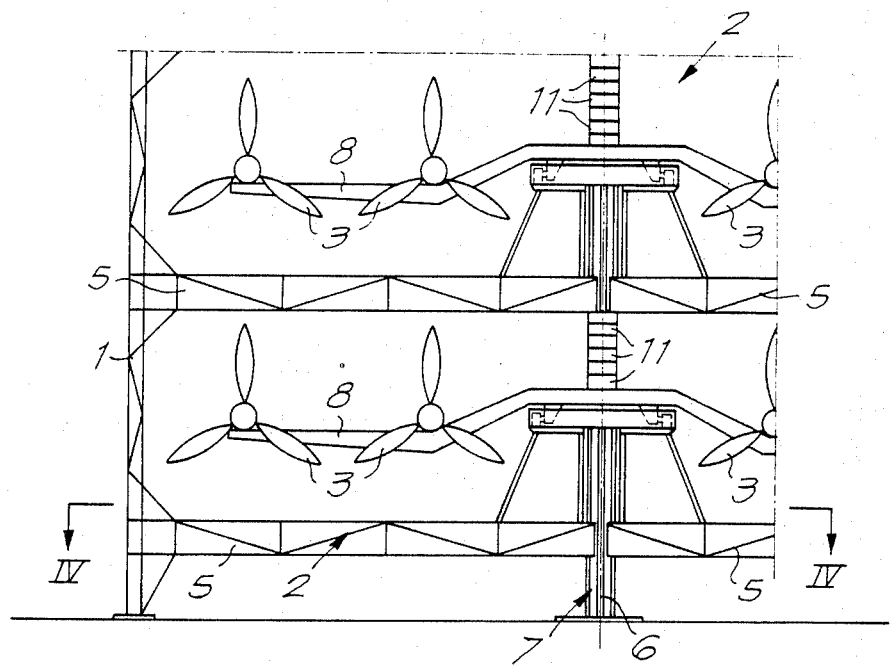
FIG. 3 shows an alternate embodiment.

It is apparent that every wind device 3 or every group of wind devices 3 is connected to a generator. In the alternate embodiment of FIG. 3, the axis 7 is continuous.

In this embodiment, the axis 7 has preferably longitudinal grooves in which conductors or the like may housed. Collecting rings 11 diagrammatically represented in FIG. 3 may be mounted about the axis 7.

Figure 4:
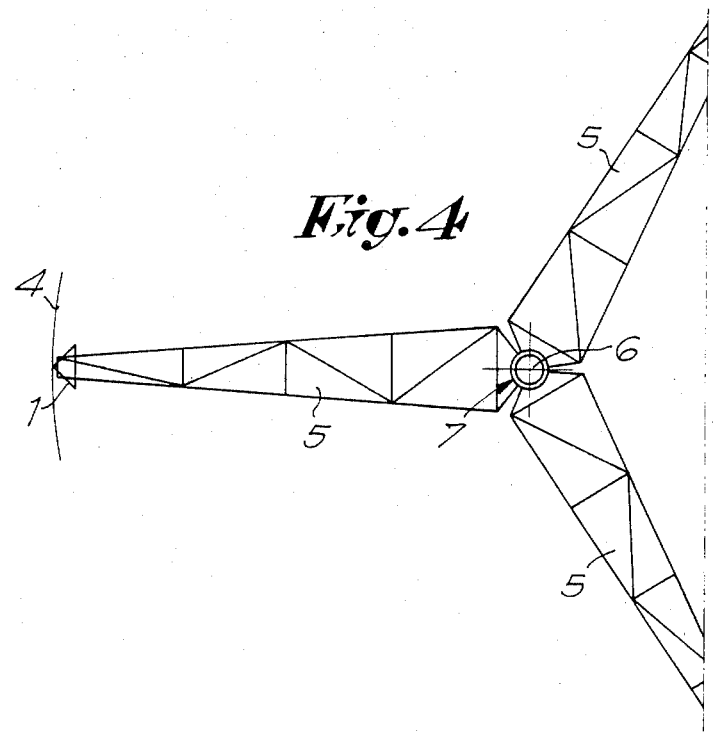
FIG. 4 shows a section taken on the lines IV—IV of FIG. 3.

FIG. 4 shows that the crossbeams 5 are secured to or respectively supported by the axis 7.

Figure 5:
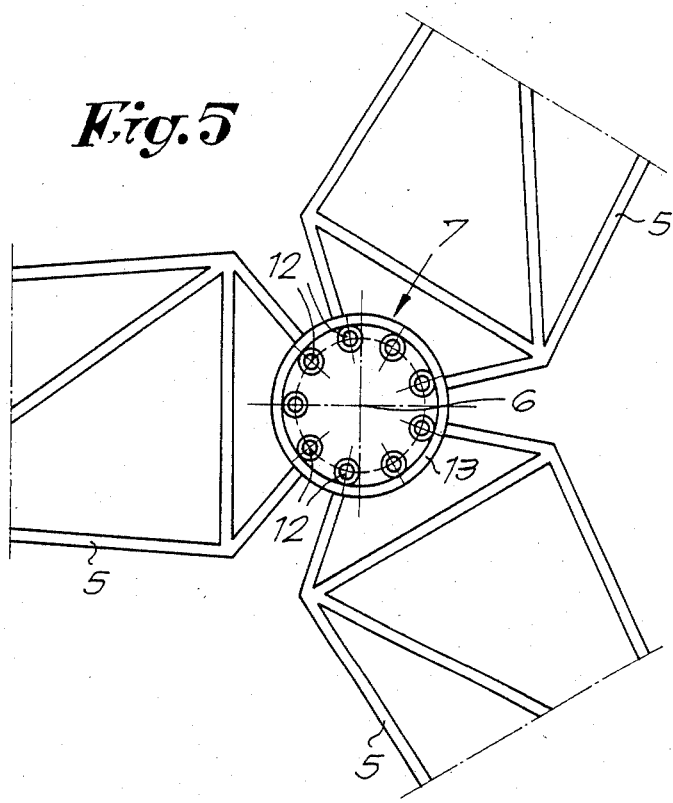
FIG. 5 shows another embodiment of a detail of FIG. 4.

FIG. 5 shows an embodiment in which the axis 7 consists of several tubes 12 interconnected through rings 13.

Figure 6:
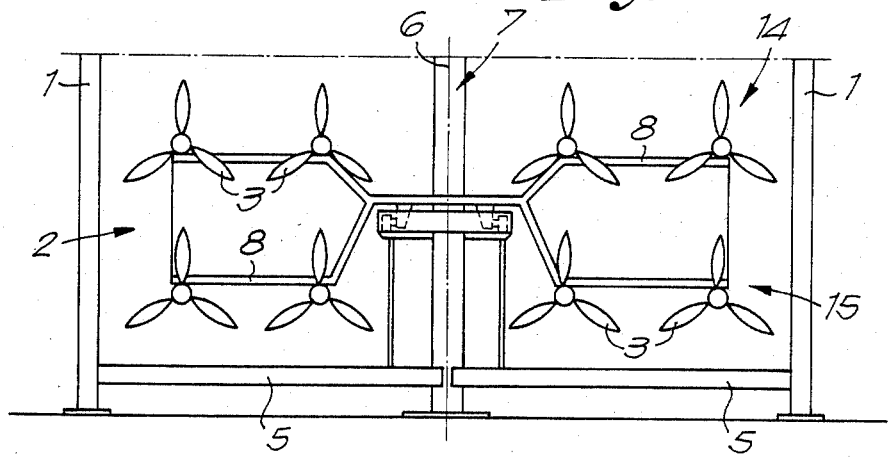
FIG. 6 shows another embodiment of the engine according to the invention.

FIG. 6 shows still another embodiment in which the bearing elements 8 are divided into two superimposed portions 14 and 15 connected with a rotating central portion about the axis 7.

Finally, FIG. 7 shows an embodiment comprising, at each stage, only one wind device 3 rotatably mounted on the upper end of the vertical axis 7.

In this embodiment, driving means (not shown in the drawings), e.g. an electric motor or the like, are provided between the wind device 3 proper and the corresponding vertical axis, it being thereby possible to orientate every wind device in the wind in the same manner as for the other embodiments.

It is apparent that the present invention is not at all limited to the examples described and represented in the enclosed drawings, but that, on the contrary, it includes the wind-engines in any shapes and sizes.

I claim:

1. A wind-engine of the type provided with several wind devices rotatably mounted at several independent stages comprising:
    (a) a plurality of vertical props disposed in a circular configuration and defining a center axis;
    (b) means forming at least one vertical axis at the center axis of the circular configuration;
    (c) a plurality of vertically spaced independent stages connected to the vertical props;
    (d) each stage including a plurality of radially extending crossbeams, one end of each crossbeam being connected to the vertical axis means and the other end of each crossbeam being connected to a corresponding vertical prop; and
    (e) at least one wind device rotatably supported on the vertical axis means.

2. The wind-engine of claim 1 wherein each stage further includes a plurality of bearing elements extending radially outwardly from the vertical axis means, and a plurality of wind devices supported on each bearing element.

3. The wind-engine of claim 2 wherein the bearing elements are positioned on opposite sides of the crossbeams.

4. The wind-engine of claim 1 further including a separate vertical axis means provided for each stage and a separate wind device rotatably supported on the upper end of each vertical axis means.

5. The wind-engine of claim 4 further including driving means for rotatably positioning each wind device about its corresponding vertical axis means independently of the remaining wind devices.

* * * * *